United States Patent [19]

Strange et al.

[11] Patent Number: 4,618,910
[45] Date of Patent: Oct. 21, 1986

[54] ELECTRICAL CIRCUIT INTERRUPTER FOR DRY METALLIZED FILM CAPACITORS

[75] Inventors: Thomas F. Strange; John W. Carino, both of Columbia, S.C.

[73] Assignee: North American Philips Corporation, New York, N.Y.

[21] Appl. No.: 664,659

[22] Filed: Oct. 25, 1984

[51] Int. Cl.⁴ .............................................. H01G 1/11
[52] U.S. Cl. .................................... 361/275; 29/25.42
[58] Field of Search .................................. 361/15–17, 361/271, 272, 275; 361/433, 274; 29/25.42

[56] References Cited

U.S. PATENT DOCUMENTS

| | | | |
|---|---|---|---|
| 3,304,473 | 2/1967 | Netherwood et al. | 361/272 |
| 3,473,088 | 10/1969 | Ernst | 361/15 |
| 3,731,130 | 5/1973 | Dutta | 361/272 |
| 3,831,070 | 8/1974 | Boville et al. | 361/272 |
| 3,909,683 | 9/1975 | Kysely | 361/15 |
| 4,186,417 | 1/1980 | Grahame | 361/15 |

Primary Examiner—A. D. Pellinen
Assistant Examiner—Jeffrey A. Gaffin
Attorney, Agent, or Firm—Thomas A. Briody; William J. Streeter; Edward W. Goodman

[57] ABSTRACT

An electrical dry metallized film capacitor includes a capacitor roll section, formed from a metallized film having connecting leads attached to the top and bottom thereof. The capacitor roll section is then coated with a non-stick coating and then inserted into a closed-end container, the connecting lead attached to the bottom of the capacitor roll section being dressed along the side thereof to the open end of the container. Potting compound is then inserted into the container up to the top of the capacitor roll section. Upon electrical failure of the capacitor, the non-stick coating allows gases, formed in the capacitor roll section, to axially shift the capacitor roll section thereby breaking the connection to the bottom connecting lead which is securely held by the potting compound.

9 Claims, 2 Drawing Figures

ELECTRICAL CIRCUIT INTERRUPTER FOR DRY METALLIZED FILM CAPACITORS

BACKGROUND OF THE INVENTION

The invention relates to electrical circuit interrupters for capacitors, in particular, for dry capacitors of the metallized film type.

In a typical capacitor, a capacitor roll section is assembled in a container having a cover sealed thereto. Electrical connecting leads pass from the capacitor roll section in the container through the cover. In such a capacitor, failures result from internal arcing and thermal runaway, which cause gases to be formed in the capacitor roll section. These gases escape from the capacitor roll section and cause a pressure buildup in the container causing, in turn, the container, or the cover, to bulge to such an extent that the seal, or the container itself, fails. If such a capacitor is filled with a dielectric fluid, the fluid can then leak from the container causing damage to surrounding components and, if the fluid is flammable, a potential fire hazard.

In U.S. Pat. Nos. 3,377,510 to Rayno and 4,106,068 to Flannagan, there is disclosed a pressure-sensitive circuit interrupter combined with a fluid-filled electrical capacitor. The pressure buildup within the capacitor roll section is transmitted through the fluid to a deformable cover carrying connecting terminals. The deformation of this cover due to the transmitted pressure moves at least one of the terminals to such an extent that the electrical connection between this terminal and the capacitor roll section is broken. This removes the electrical potential on the capacitor roll section, which then ceases to produce gases therein thereby terminating the pressure buildup. The interrupter is dimensioned such that the electrical connection is broken by the deformation before the seal between the cover and the container, or the container itself, fails.

It has been suggested that this same type interrupter be used with dry metallized film capacitors. This has proven to be impractical since the air captured within the sealed container, unlike fluids, is compressible and does not as readily transmit the pressure buildup in the capacitor roll section. This leads to an inordinately long delay between the failure of the capacitor roll section and the breaking of the electrical connection, and the resulting generation of an increasing pressure differential between the interior of the capacitor roll section and the surrounding air in the container. This pressure differential may then be sufficient to rupture the container even though the electrical connection to the capacitor roll section is broken.

SUMMARY OF THE INVENTION

An object of this invention is to provide an electrical circuit interrupter for a dry metallized film capacitor which rapidly responds to failure of the capacitor. This object is achieved in a method for manufacturing an electrical dry metallized film capacitor with an electrical circuit interrupter, the method including the steps:

forming a capacitor roll section from the metallized film;

attaching connecting leads to a top and a bottom end of the capacitor roll section, the capacitance of the capacitor being established between the connecting leads;

applying a non-stick coating to the capacitor roll section;

inserting the capacitor roll section into a container closed at one end thereof such that the bottom end of the capacitor roll section is adjacent the closed end of the container, the connecting lead attached to the bottom end of the capacitor roll section extending along a side thereof to an open end of the container; and filling any space between the capacitor roll section and the container with a potting compound up to the top end of the capacitor roll section, whereby, upon failure of the capacitor due to an electrical potential applied to the connecting leads, the non-stick coating will enable gases formed in the capacitor roll section, due to the failure, to axially shift the capacitor roll section away from the closed end of the container thereby breaking the electrical connection between the bottom end of the capacitor roll section and the connecting lead attached thereto.

DESCRIPTION OF THE DRAWING

With the above and additional objects and advantages in mind as will hereinafter appear, the invention will be described with reference to the accompanying drawing, in which.

DESCRIPTION OF THE PREFERRED EMBODIMENT

Figure 1:
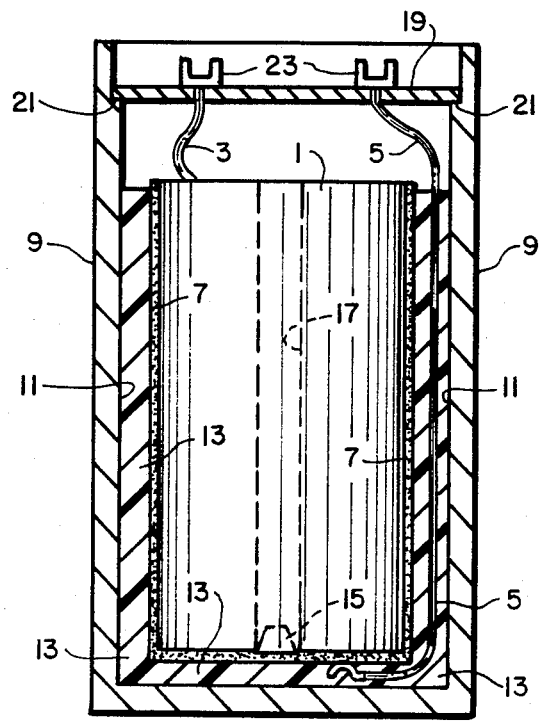
FIG. 1 shows, in cross-section, a capacitor incorporating the subject invention.

In FIG. 1, a capacitor roll section 1 is formed in a customary manner from a metallized film, for example polypropylene. A first connecting lead 3 is attached to the capacitor roll section 1 at one end thereof, electrically connecting this lead 3 to one conducting layer on the film. A second connecting lead 5 is attached to the opposite end of the capacitor roll section 1, electrically connecting this lead 5 to the other conducting layer on the film.

A non-stick coating 7 is then applied to the outside of the capacitor roll section 1. This non-stick coating 7 is permeable to gases and may be, for example, mold release, "peel strip", etc. The coated capacitor roll section 1 is then inserted into a container 9, the connecting lead 5 extending along a side of the capacitor roll section 1 to the open end of the container 9. The open space 11 between the capacitor roll section 1 and the container 9 is then filled with a potting compound 13, for example epoxy resin, up to the end of the capacitor roll section 1 adjacent to the open end of the container 9. A plug 15 is shown at the bottom end of the capacitor roll section 1 in a central hole 17 therein to prevent the potting compound 13 from travelling up the central hole 17 from the bottom of the container 9, which potting compound 13 would otherwise prevent the capacitor roll section 1 from moving, and also to prevent gases formed at the bottom of the capacitor roll section 1 from escaping through the central hole 17. This central hole 17 may then also be filled from the top end thereof with the potting compound 13.

Finally, a top cover 19 is mounted in the container 9 and is located by a shoulder 21 formed around the inside periphery of the container 9 near the open end thereof. The cover 19 includes terminals 23 mounted thereon to which the first and second connecting leads 3 and 5 are electrically attached, respectively. The terminals 23 provide means by which the capacitor is connected in a circuit.

Figure 2:
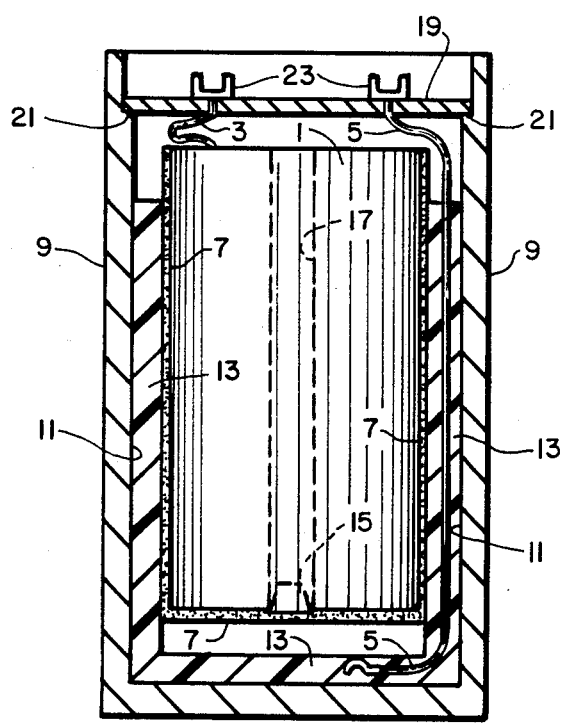
FIG. 2 shows, in cross-section, the capacitor in FIG. 1 after having failed.

In operation, an electrical potential is applied across the terminals 23. Upon failure of the capacitor, gases are generated in the capacitor roll section 1 and escape therefrom through the ends thereof. The gases escaping through the top end of the capacitor roll section 1 have no effect on the operation of the capacitor due to the relatively large volume of compressible air at the top of the capacitor roll section 1. However, the gases escaping from the bottom end of the capacitor roll section 1 rapidly build up in pressure due to the potting compound 13 surrounding this end. Since the capacitor roll section 1 was first coated with the non-stick coating 7 before being potted, the capacitor roll section 1 shifts axially in an upward direction. This shifting breaks the connection between the capacitor roll section 1 and the connecting lead 5, since the connecting lead 5 is securely held in the potting compound 13, thereby interrupting the electrical circuit (see FIG. 2).

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What we claim:

1. A method of manufacturing an electrical dry metallized film capacitor with an electrical circuit interrupter, said method comprising the steps:

forming a capacitor roll section from said metallized film, attaching connecting leads to at least one end of said capacitor roll section, the capacitance of said capacitor being established between said connecting leads;

inserting said capacitor roll section into a container having a closed end such that said one end of said capacitor roll section is at said closed end of said container;

anchoring one of said connecting leads attached to said one end of said capacitor roll section to said closed end of said container, and slidably sealing said capacitor roll section in said container, whereby, upon failure of said capacitor due to an electrical potential applied to said connecting leads, gases formed in said capacitor roll section, due to said failure, escaping from said one end thereof, cause said capacitor roll section to move away from said closed end of said container thereby breaking the electrical connection between the one end of the capacitor roll section and the anchored connecting lead attached thereto.

2. A method of manufacturing an electrical dry metallized film capacitor with an electrical circuit interrupter, said method comprising the steps:

forming a capacitor roll section from said metallized film;

attaching connecting leads to a top and a bottom end of said capacitor roll section, the capacitance of said capacitor being established between said connecting leads;

applying a non-stick coating to said capacitor roll section;

inserting said capacitor roll section into a container closed at one end thereof such that the bottom end of said capacitor roll section is adjacent said closed end of said container, the connecting lead attached to said capacitor roll section bottom end extending along a side of the capacitor roll section to an open end of said container; and filling any space between said capacitor roll section and said container with a potting compound up to the top end of said capacitor roll section, whereby, upon failure of said capacitor due to an electrical potential applied to said connecting leads, said non-stick coating will enable gases formed in said capacitor roll section, due to said failure, to axially shift said capacitor roll section away from the closed end of said container thereby breaking the electrical connection between the bottom end of the capacitor roll section and the connecting lead attached thereto.

3. The method as claimed in claim 2, wherein said method further comprises attaching said connecting leads to terminals carried on a cover, and attaching said cover to the open end of said container.

4. An electrical dry metallized film capacitor comprising:

a capacitor roll section, formed from a metallized film, having a first and a second connecting lead electrically connected to a top and a bottom end, respectively, of said capacitor roll section, the capacitance of said capacitor being established between said connecting leads;

a container closed at one end thereof for receiving said capacitor roll section, said bottom end of said capacitor roll section being adjacent said closed end of said container and said second connecting lead extending along a side of said capacitor roll section to an open end of said container;

means for rigidly fixing said second connecting lead with respect to said container; and means for holding said capacitor roll section with respect to said container allowing only axial movement thereof, whereby, upon failure of said capacitor due to an electrical potential applied across said connecting leads, gases formed in said capacitor roll section, due to said failure, axially shift said capacitor roll section away from the closed end of said container thereby breaking the connection between the bottom end of said capacitor roll section and said second connecting lead.

5. An electrical dry metallized film capacitor as claimed in claim 4, wherein said fixing means comprises a potting compound surrounding said second connecting lead at said bottom end of said capacitor roll section, and said holding means comprises a non-stick coating applied to said capacitor roll section and said potting compound further surrounding said coated capacitor roll section and said second connecting lead up to the top end of said capacitor roll section.

6. An electrical dry metallized film capacitor as claimed in claim 5, wherein said potting compound is epoxy resin and said non-stick coating is a mold release.

7. An electrical dry metallized film capacitor as claimed in claim 4, wherein said capacitor further comprises a top cover for closing said open end of said container, said top cover having electrical terminals mounted thereon to which said first and second connecting leads are attached, respectively.

8. An electrical dry metallized film capacitor as claimed in claim 7, wherein said container and said cover are non-metallic.

9. An electrical dry metallized film capacitor as claimed in claim 4, wherein said film is polypropylene.

* * * * *